O. H. FOSS.
SKIN MARKER.
APPLICATION FILED MAR. 18, 1920.

1,363,104.  Patented Dec. 21, 1920.

WITNESSES

INVENTOR
Olaf H. Foss.
BY Munn & Co
ATTORNEYS

UNITED STATES PATENT OFFICE.

OLAF H. FOSS, OF MADDOCK, NORTH DAKOTA.

SKIN-MARKER.

1,363,104.

Specification of Letters Patent.

Patented Dec. 21, 1920.

Application filed March 18, 1920. Serial No. 367,023.

*To all whom it may concern:*

Be it known that I, OLAF H. Foss, a citizen of the United States, and a resident of the city of Maddock, in the county of Benson and State of North Dakota, have invented a new and Improved Skin-Marker, of which the following is a full, clear, and exact description.

This invention relates to improvements in skin markers, an object of the invention being to provide a skin marker which when moved over a skin will operate to cut or sever the skin, and at the same time provide a series of transverse cuts at both edges of the severed portion which may be of a depth and spaced apart a uniform distance so as to identify the goods.

A further object is to provide a portable device of the character stated which can be easily manipulated and which will most efficiently perform the functions for which it is intended.

With these and other objects in view, the invention consists in certain novel features of construction and combinations and arrangements of parts as will be more fully hereinafter described and pointed out in the claims.

In the accompanying drawings:

Figure is a view in side elevation of my improved device.

Figure 1:
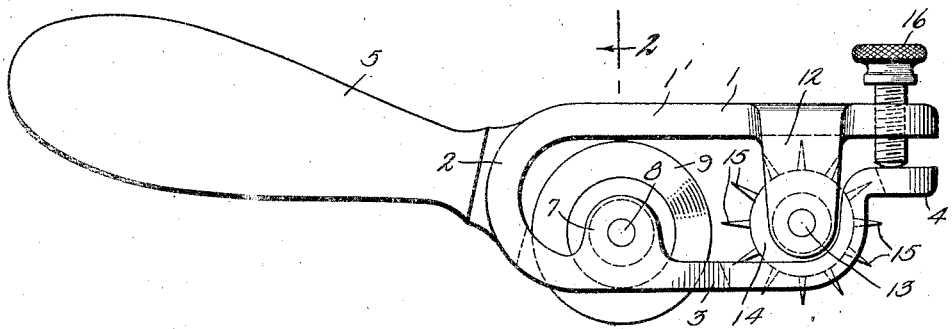
Figure 2:
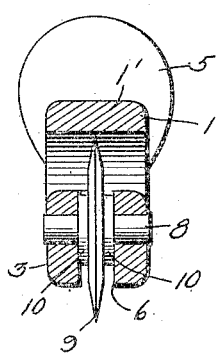
Fig. 2 is a view in section on line 2—2 of Fig. 1.
Figure 3:
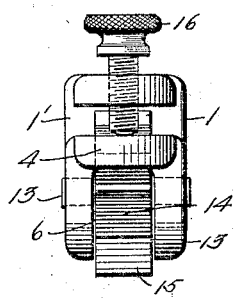
Fig. 3 is an end view.

1 represents a spring frame having a relatively horizontal straight upper portion 1', connected at its inner end by an integral curved member 2 with lower member 3, comparatively horizontal or straight throughout the greater portion of its length, but adjacent its free end, said member 3 is curved upwardly and terminates in a forwardly projecting tongue 4.

A handle 5 is fixed to the rear end of the frame 1 and is preferably at a slight angle as shown.

The member 3 is made with a longitudinal slot 6, and at opposite sides of the slot 6 adjacent the rear end of the frame is formed with upwardly projecting perforated lugs 7. A journal pin 8 is mounted in the lugs 7 and a disk cutter 9 is supported on the journal pin 8 and provided with enlargements or spacing collars 10 at opposite sides, spacing the disk from the walls of the slot.

Figure 4:
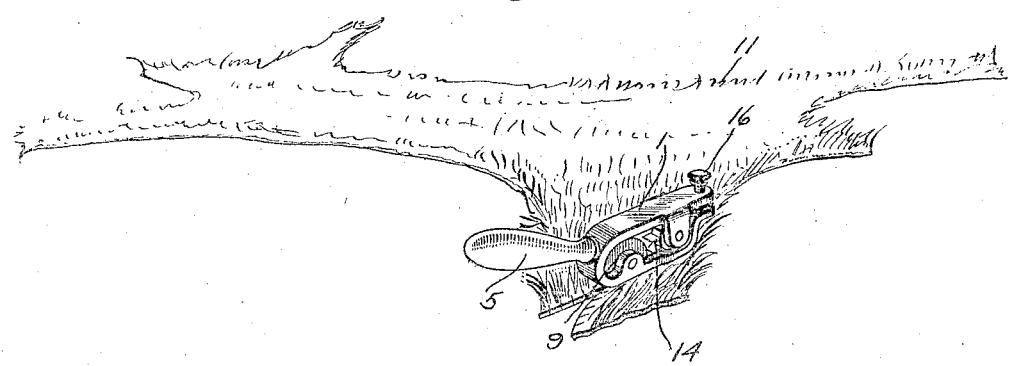
Fig. 4 is a perspective view showing the device in operation.

The cutter 9 projects below the frame 1 so that when the latter is moved over a skin 11, as shown in Fig. 4, it will operate to sever the skin.

The upper frame member 1', adjacent its forward end, is provided at its side edges with depending perforated lugs 12 supporting a journal pin 13 on which a marking cutter 14 is mounted.

This marking cutter is made with a circular series of radially projecting cutting blades 15, having sharp cutting edges projecting transversely of the frame, and of a length to project through the slot 6 and below the lower face of the frame member 3.

A set screw 16 is mounted in the free end of member 1' and bears against the tongue 4, so that by adjusting the screw 16 the frame member 3 can be adjusted toward or away from the member 1' to regulate the depth of cutting of the blades 15.

The operation is as follows:

The device is moved longitudinally over the skin 11, as shown in Fig. 4, and the disk 9 operates to sever the skin 11, and the cutter 14 operates to cut into the edges of the skin slits or cuts of the desired depth as regulated by the set screw 16.

Various slight changes might be made in the general form of the parts described without departing from my invention, and hence I do not limit myself to the precise details set forth, but consider myself at liberty to make such slight changes and alterations as fairly fall within the spirit and scope of the appended claims.

I claim:

1. In a device of the character stated, a spring frame comprising two members, one of said members having a slot therein, a disk cutter mounted in said slotted member and movable in said slot, and a rotary marking cutter mounted in the other member and movable in said slot.

2. A device of the character stated comprising a spring frame, said frame having a slotted portion, a disk cutter and a rotary marking cutter carried by said frame and movable in said slot, and means for adjusting the depth of marking of said marking cutter.

3. A device of the character stated, comprising a spring frame having upper and lower members, said lower members having a longitudinal slot therein, a disk cutter supported by the lower frame member and projecting through the slot therein, and a marking cutter supported by the upper member and also projecting through the said slot.

4. A device of the character stated, comprising a spring frame having upper and lower members, said lower members having a longitudinal slot therein, a disk cutter supported by the lower frame member and projecting through the slot therein, a marking cutter supported by the upper member and also projecting through the said slot and means for adjusting the frame toward and away from each other.

5. A device of the character stated, comprising a spring frame having upper and lower members, said lower members having a longitudinal slot therein, a disk cutter supported by the lower frame member and projecting through the slot therein, and a marking cutter supported by the upper member and also projecting through the said slot, and a set screw supported by the upper frame member and engaging the lower frame member.

6. A device of the character stated comprising a spring frame, having upper and lower members connected at their rear ends, a handle secured to the rear end of the frame, a disk cutter on the lower frame member, a rotary marking cutter on the upper frame member having a circular series of radial transversely cutting blades, and means for adjusting the frame members toward and away from each other.

OLAF H. FOSS.